Jan. 6, 1970  J. A. VIETORISZ  3,487,849
VALVE
Filed Sept. 18, 1967  2 Sheets-Sheet 1
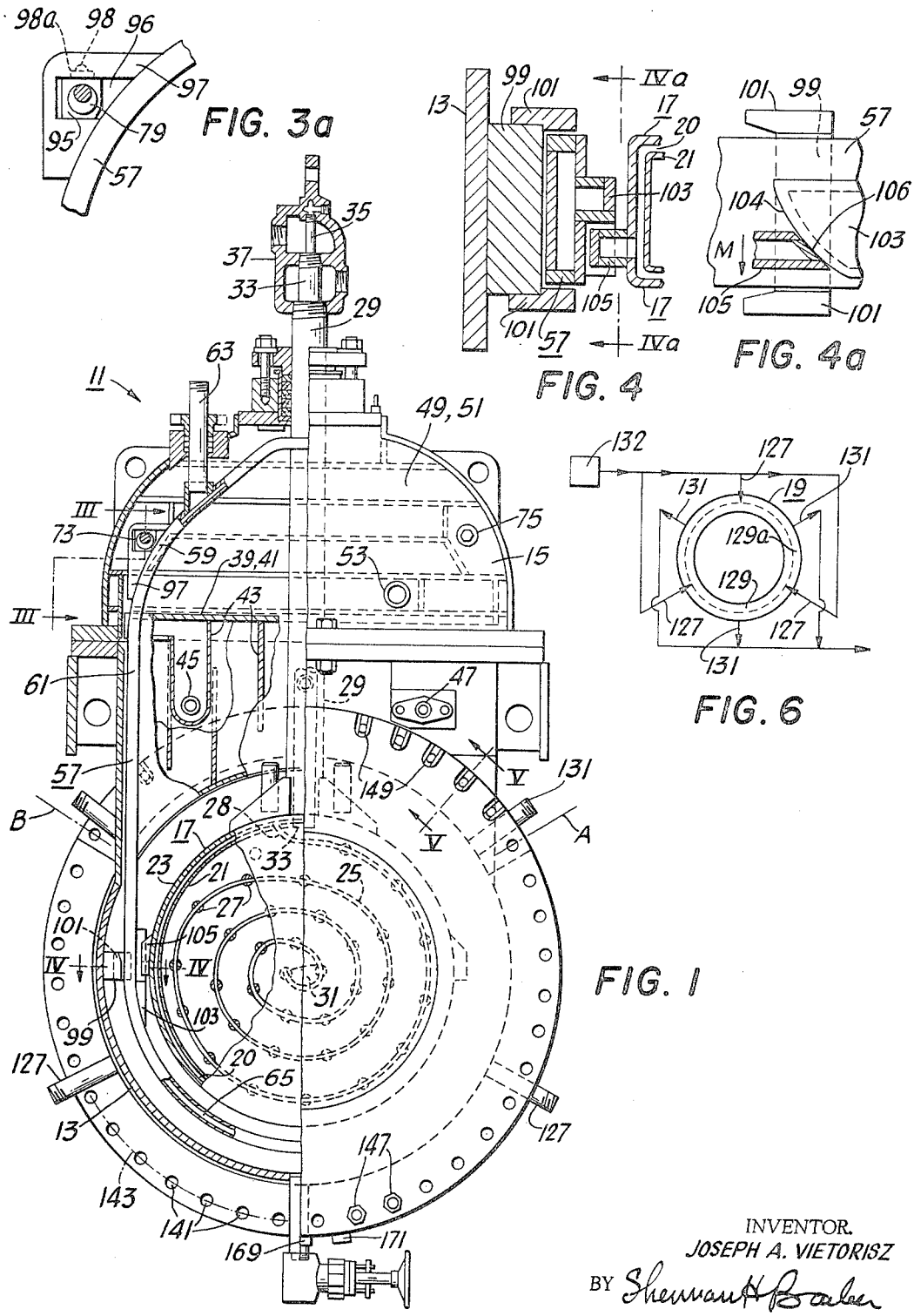
INVENTOR.
JOSEPH A. VIETORISZ
BY Sherman H. Barber
his Attorney Jan. 6, 1970 J. A. VIETORISZ 3,487,849

VALVE

Filed Sept. 18, 1967 2 Sheets-Sheet 2

INVENTOR.
JOSEPH A. VIETORISZ
BY Sherman H. Barber
his Attorney

United States Patent Office 3,487,849
Patented Jan. 6, 1970

3,487,849
VALVE
Joseph A. Vietorisz, Pittsburgh, Pa., assignor to Koppers Company, Inc., a corporation of Delaware
Filed Sept. 18, 1967, Ser. No. 668,411
Int. Cl. F16k 49/00
U.S. Cl. 137—340   8 Claims

ABSTRACT OF THE DISCLOSURE

A flangeless hot-blast valve includes a water-cooled bonnet, water cooled removable panels in a housing, and a water cooled O-panel surrounding a valve disc. The O-panel is adjustably supported within the valve by means of eccentric pins. Hollow water-cooled valve seats cooperate with flanged ends of conduits between which the valve is positioned, and the valve is maintained in position both by through bolts connecting the flanged ends, and by bolts cooperating with lugs mounted to the valve housing.

BACKGROUND OF THE INVENTION

This invention relates to valves and, more particularly, to an improved gate valve for use as a hot blast valve with a furnace, or for use in a service wherever the temperature of a fluid passing through such a valve is relatively high.

Hot blast valves are used generally to control the flow of hot air from a stove to the hot blast main leading to the blast furnace bustle pipe, and sometimes an additional hot blast valve is used in the hot blast main at a location near the bustle pipe.

Recently, with the use of beneficiated burdens, moisture and fuel injection, it became advantageous to utilize higher blast temperatures which resulted in a substantial saving of coke. However, these higher blast temperatures created many problems. Gate valves, for instance, which are used for hot blast valves, had to be redesigned. Originally only the disc and seats were water cooled. For 2000° F. blast temperature the valve body must also be cooled and the gates and seats provided with a higher velocity of water. Even with these improved designs the hot blast valves require close attention because of water leaks and distortions due to hot spots. Maintenance became of major importance, and hot blast valves are now offered which can be serviced without removing the valve body from the main line in which it is installed.

Recognizing the fact that, in a hot blast valve or in any valve servicing high temperature fluids, most of the trouble can be eliminated if thermal movements are put under control and minimized, and that excessive stress accumulations must be prevented, the valve design was changed in order to separate the heat and pressure loads on the body shell; also, the gate was shaped in a novel way to suit the trend toward ever increasing hot blast temperatures.

SUMMARY OF THE INVENTION

A gate valve housing having an aperture therein is provided with a fluid cooled valve disc, with fluid cooled panels, and with a fluid cooled O-panel surrounding the disc. The fluid-cooled O-panel that surrounds the valve disc is located within and is adjustably mounted to, the housing. Valve seats, also mounted to the valve housing, have inserts that provide annular passages for cooling fluid circulating in the valve seats. The valve seats contact the flanged ends of tubular conduits between which the valve is located and fasteners, engaging the opposed flanged ends of the conduits, secure the valve in position.

BRIEF DESCRIPTION OF THE DRAWINGS

In the drawings:
FIG. 1 is a schematic front view, partly in section, of a gate valve in accordance with the invention;
FIG. 3a is a view along line IIIa–IIIa of FIG. 3;
FIG. 4 is a view along line IV–IV of FIG. 1 ;
and
FIG. 4a is a view along line IVa–IVa of FIG. 4;
FIG. 6 is a schematic diagram of the flow of cooling fluid in the valve seats.

DETAILED DESCRIPTION

Figure 5:
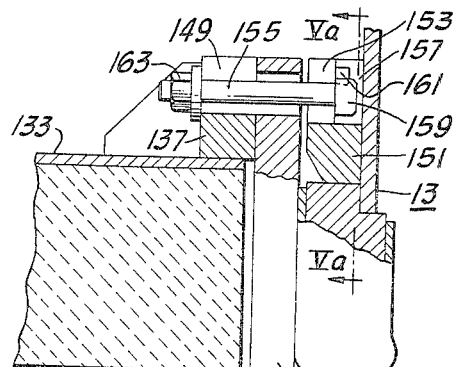
FIG. 5 is a view along line V–V of FIG. 1.

The valve 11 of FIG. 1 includes: a valve housing 13; a valve bonnet 15 mounted to the valve housing 13; a valve disc 17 that is movable within both the housing 13 and the bonnet 15; and valve seats 19 that are fixed to the housing 13 and that sealingly cooperate with the valve disc 17, and with the flanged ends 137, 139 of conduits 133, 135 respectively.

The valve disc 17 is similar to the valve disc 17 described in my copending application Ser. No. 594,058 filed Nov. 14, 1966, and comprises, generally, a hollow circular inner first shell 21 that is concentric with and spaced apart from an outer second shell 23 that encapsulates the first shell 21. Between the outer surfaces of that inner first shell 21 and the inner surfaces of the outer second shell 23, there are spirally-shaped, fluid flow vane bars 25 that are freely supported by a plurality of studs 27 that maintain the inner 21 and the outer 23 shells in spaced apart relation. The vane bars 25 are arcuately shaped at the top end 28 (FIG. 1) to direct cooling water flowing into the annular spaces 20 between shells 21, 23 through an annulus in conduit 29, around the spiral paths determined by the shape of the vane bars 25. The cooling water flows along the spiral paths toward central openings 31 in the inner shells 21 and thence out of the valve disc 17 through a conduit 33, concentrically arranged within conduit 29. Both conduits 29, 33 act as a valve stem that is used to raise and lower the valve disc 17. A syphon tube 35 (FIG. 2) is centrally arranged in the inner conduit 33 and extends to a point adjacent the lowermost point in the inner shell 21. The syphon tube 35 connects to an adapted fitting 37, located at the top of the valve to which the upper ends of both the inner 33 and outer conduits 29 are also connected. The syphon tube 35 is used to drain water from the inner shell 21 of the valve disc 17 whenever it is deemed desirable or necessary to do so.

The valve housing 13 is similar also to the valve housing described in my copending application; including a pair of hollow side panels 39, 41 that are located in spaced apart opposed relation within the housing 13. Each panel comprises an envelope in which a plurality of baffles 43 are arranged so as to form a labyrinth-type flow path for cooling fluid entering the panels through conduit 45 and leaving the panels through conduit 47. The panels 39, 41 are simply supported within the housing because it is desirable and sometimes necessary after removing the bonnet 15, to remove and replace a panel that leaks or is otherwise damaged. Also, the panels 39, 41 can freely expand when heated since they are not restrained within the housing which might cause the panels to warp excessively.

The valve bonnet 15 includes front 49 and back 51 parallel spaced apart hollow panels in which cooling water circulates. The cooling water enters the panels 49, 51 through conduit 53 and discharges through conduit 55. The bonnet 15 has the general shape and configuration shown in FIGS. 1 and 2.

Within both the valve housings 13 and the valve bonnet 15, there is a hollow water cooled O-shaped panel 57 that is disposed between the side panels 39, 41 and 49, 51. The O-panel 57 surrounds the lower half of the valve disc 17 when it is in the closed position, and the O-panel 57 surrounds the upper half of the valve disc 17 when it is in the open position. The portion 59 of the hollow O-shaped panel 57 at the top of the valve bonnet 15 is somewhat wider (as viewed in FIG. 2) than the portion 61 of the hollow O-shaped panel 57 within the valve housing 13. The hollow O-shaped panel 57 is baffled near the top so that water flows into the panel via inlet conduit 63 and, after circulating through the flow passage 65 in the panel, emerges via outlet conduit 67.

Figure 3:
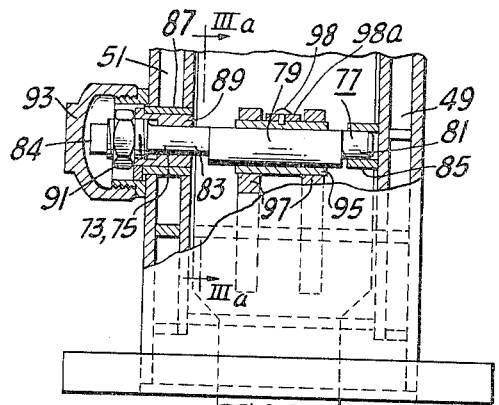
FIG. 3 is a view along line III–III of FIG. 1.

The water cooled O-shaped panel 57 is supported within the housing 13 and bonnet 15 upon two adjusters 73, 75, one of which is shown in FIG. 3, that are located on opposite sides of the valve bonnet 15 about where shown in FIG. 1. The adjusters 73, 75 comprise a horizontally arranged cylindrical pin 77 having an eccentric central portion 79 with ends 81, 83 that are journalled in bearings 85, 87 fixed to the front 49 and back 51 panels respectively. The end 83 of pin 77 is fitted with a sleeve 89 that is journalled in the bearing 87. The end 83 is also threaded into the sleeve 89 and a lock nut 91 threaded onto the end 83 bears against the sleeve 89 to maintain the sleeve 89 in a fixed position on the pin 77. The extreme end portion 84 of pin 77 has a head of square cross section that cooperates with a suitable tool, such as a wrench, adapted for rotating the pin 77. A threaded cap 93 covers the square end 84 to protect it and to seal it against leakage of hot gases past the sleeve 89.

The eccentric portion 79 cooperates with a nut 95 that is fitted in rectangular slots 96 in the spaced apart lugs 97; such lugs 97 being welded, or otherwise suitably mounted, to the water cooled O-panel 57, within the bonnet 15, as shown in FIGS. 3 and 3a. A screw or pin 98 secures a small bar 98a to the top of the nut 95, which is thereby prevented from becoming disengaged from the slots 96.

When the adjusters 73, 75 are turned by a tool fitted to the square end 84 of the pins 77, the eccentric portion 79 moves only the nut 95 horizontally in the slots 96, but, at the same time, the eccentric portion 79 moves the O-panel either up or down vertically. The horizntal force excited by rotating the eccentric portion 79 is taken up on moving the nut 95 horizontally so that no horizontally directed stress is imposed upon the O-panel.

The water cooled O-shaped panel 57 also is guided as it moves up and down vertically by cooperating guides 101 attached to the valve housing 13 as shown in FIG. 4 and FIG. 4a. Abutments 99 are welded to the inner surface of the housing 13 and the guide bars 101 are fixed to each vertical side of the abutment 99. Thus, the water cooled O-shaped panel 57 is disposed to move vertically between the guide bars 101.

The water cooled O-shaped panel 57 also has an elongate member 103 fixed to its inner surface that has a rounded top portion 104 (FIG. 4a) and the member 103 is hollow and in fluid communication with the coolant water passage 65 in the O-panel 57.

Wedge members 105, that are mounted to the valve disc 17, have angularly sloping bottom surfaces 106 that cooperate with the arcuate top surface 104 of the member 103. The wedge member 105 is in fluid communication with the annulus 20 of the valve disc, and so is water cooled. Thus, when the valve disc 17 moves downwardly, the surfaces 104, 106 cooperate to move the valve disc in the direction of the arrow M (FIG. 4a) and the valve disc 17 seats initially against the projecting portion 173 of the valve seat 19.

Figure 2:
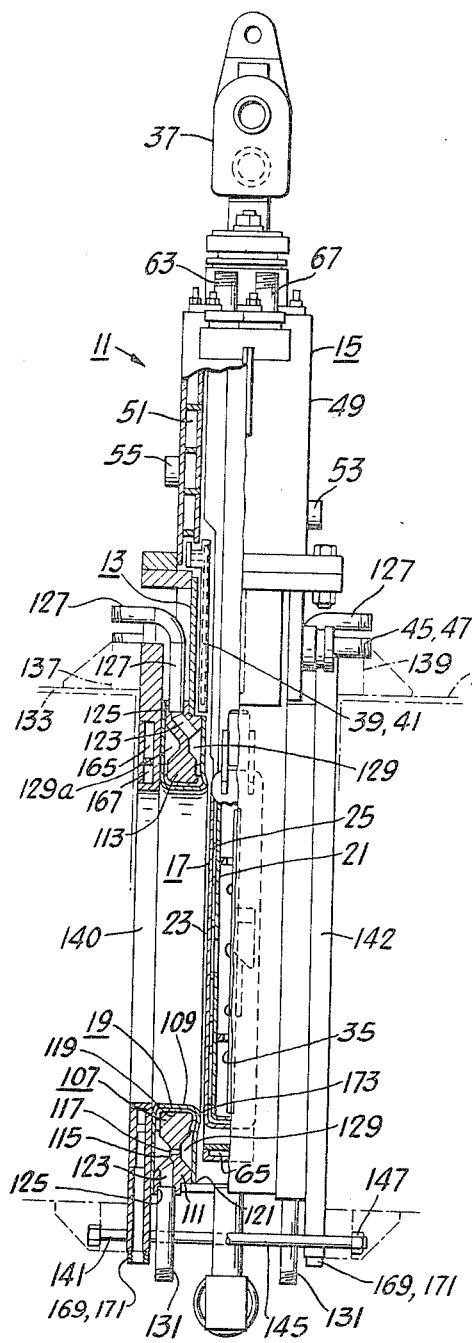
FIG. 2 is a side view, partly in section, of the valve of FIG. 1.

FIG. 2 illustrates a cross section through the valve seat 19, which includes a circular insert member 107, and a thin diaphragm 109 surrounding and spaced apart from the insert 107. Thus, narrow annular cooling water passages are provided between the insert member 107 and the diaphragm 109.

The circular insert member 107 is comprised of a first outer annular portion 111 having a cross section shaped about as shown in FIG. 2; a second inner annular portion 113, of smaller diameter than the first portion 111, having a cross section shaped about as shown in FIG. 2. A relatively thin annular web 115 joins together the first 111 and second 113 portions. The relatively thin web 115 has a small aperture 117 at the bottom or lowest point that affords fluid flow through the web 115 to thereby drain the plenum chambers 129, 129a mentioned hereinafter.

The relatively thin membrane 109 is maintained in spaced apart relation to the insert 107 by a plurality of spacers 119, located about where shown in FIG. 2, that are welded, or otherwise suitably mounted, to the inner member 113. The circular edges 121 of the diaphragm 109 are sealingly attached to the first annular portion 111, as by welding or in any other suitable manner.

The outer first member 111 is provided with a plurality of spaced apart fluid passages 123 having threaded ports 125 for receiving conduits 127 that carry cooling water into plenum chambers 129, 129a. The cooling water circulates in the plenum chamber and in the annulus between the diaphragm 109 and the second annular portion 113, and then exits the valve seats via conduits 131. FIG. 6 is a schematic diagram of the cooling water flow path in each of the valve seats 19. The cooling water flows from a source of supply 132 through inlet conduits 127 into the plenum chamber 129; thence into the plenum chamber 129a; and thence out of the valve seat 19 through conduits 131 to a disposal area (not shown).

A unique feature of the valve 11 is that is has no flanges. The valve 11 is located between spaced apart ends of conduits 133, 135 in which flows fluid that is regulated and controlled by valve 11. The conduits 133, 135 have opposed flanged ends 137, 139 respectively, including adapter flanges 140, 142 that are mounted to the flanges 137, 139, as by welding or in any other suitable manner.

The valve 11 is frictionally maintained in position in the following manner. The flanges 137, 139 are provided each with a plurality of regularly spaced apart holes 141, located on bolt circle 143, that are axially aligned. In accordance with the invention, long through bolts 145 having a nut 147 threaded on one end of each bolt 145, extend through pairs of coaxial holes 141 on the portion of the bolt circle 143 extending in a clockwise direction from point A to point B.

Figure 5A:
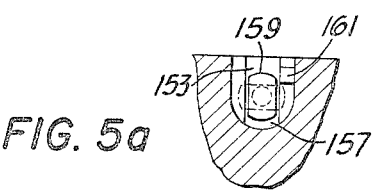
FIG. 5a is a view along line Va–Va of FIG. 5.

Between point B and point A, extending in a clockwise direction, fasteners, such as through bolts 145, cannot be used because the valve housing 13 obstructs passage of such bolts through coaxial pairs of holes 141. And so, slotted holes 149 are provided in the flanges 137, 139 and larger holes in the adapter flanges 140, 142 between points B and A, extending clockwise. Lugs 151 (FIG. 5) are welded, or otherwise suitably attached, to the housing 13 in locations opposite the slotted holes 149. Each lug 151 has a slot 153 to receive the shank of a bolt-type fastener 155, and a socket 157 to receive the head 159 of the fastener 155; the head 159 (FIG. 5a) being generally rectangular instead of the usual hexagonal shape. A stop member 161 is attached to the lug 151, about where shown in FIGS. 5, 5a, and when the bolt-type fastener 155 is rotated counterclockwise (as viewed in FIG. 5a), to the dotted position shown in FIG. 5a, the head engages the stop member 161. Nuts 163 threaded onto the bolt-type fastener 155 can then be tightened to draw the upper portion of the valve seats 19, extending clockwise between points B and A, into sealing engagement with the flanges 137, 139. When the fasteners are tightened, the flanges 137, 139, and the adapter flanges 140, 142, are drawn together and into frictional engagement with the valve seats 19, so that the valve 11 is sealingly maintained in position between the ends of the conduits 133, 135.

The adapter flanges 140, 142 are provided with outer 165 and inner 167 fluid flow annular passages. Cooling water enters the inner annular passage 167 through conduit 169 and flows therein; thereafter, the cooling water flows in the outer annular passage 169 and exits the adapter flange 140 and 142 through conduit 171. Thus, the adapter flange is maintained at a relatively cool temperature.

Several advantages and features of the invention are apparent. The use of the adapter flanges make it possible to reduce the radial dimension of the valve seat and, actually, the size of the whole valve is reduced. If such adapter flanges were not used, the valve seats would have to be large enough in diameter to contact the perforated flanges 135, 137, which would of course, have to be larger to provide enough sealing and bearing surface in contact with the valve seat. However, by using such adapter flanges sufficient sealing area is available and the entire valve is smaller in diameter.

The adapter flanges, being internally cooled, also cool the diaphragm portion of the valve seat, since there is only a relatively thin wall between the cooling water in the annuli of the adapter flange and the diaphragm. Thus, the cooling of the adapter flange also cools the valve seat.

Further, the adapter flanges permit using the same size valve in various applications, where the spacing between the flanges varies. That is to say, adapter flanges that have different thicknesses may be provided, and these flanges can be used selectively with a valve having a definite width in installations, where the distance between the flanges of the conduits is not uniform.

Moreover, the valve seat makes a more effective seal against the adapter flanges than against the refractory lining in the conduits leading to and from the valve.

A feature of the invention is the adjusters by means of which the water cooled O-shaped panel may be raised or lowered by properly positioning the panel with respect to the valve disc.

A feature of the invention is that the adjusters are operable from outside of the valve bonnet, and that the adjusters may be turned and locked in position without having to remove the valve from service.

A feature of the invention is that the flangeless hot blast valve is protected from the heat of gases passing through the valve by the water cooled panels in the bonnet in the housing, and the water cooled O-shaped panel surrounding the valve disc.

A feature of the invention is that the valve can be more easily removed from a service location than valves that are bolted into position; the valve of the invention being frictionally held in a service location and thus easily removed and replaced when service conditions dictate such a procedure.

A feature of the invention is that the valve disc and water-cooled O-shaped panel have cooperating units to center and initially seat the valve disc with respect to the valve seats; thus, after being initially seated, the pressure of fluid flowing in the conduits maintains the valve disc in a seated position.

Although the invention has been described herein with a certain degree of particularity, it is understood that the present disclosure has been made only as an example and that the scope of the invention is defined by what is hereinafter claimed.

What is claimed is:

1. A gate valve comprising:
   (a) a valve housing having an aperture for the passage of fluid through said valve;
   (b) a valve disc disposed in said valve housing and movable therein to open and close said aperture;
   (c) a fluid cooled panel disposed within said housing and surrounding said valve disc;
   (d) means to introduce cooling fluid into said panel;
   (e) means to remove cooling fluid from said panel;
   (f) fluid cooled panels, comprising a bonnet mounted to said valve housing, surrounding said valve disc and said fluid cooled panel;
   (g) hollow valve seats disposed on opposite sides of said panel and secured to said valve housing, each said valve seat being engageable with said valve disc to seal said aperture and comprising:
      (i) an insert disposed within said valve seat and spaced apart therefrom forming narrow annular fluid flow passages within said valve seat, and
      (ii) means for introducing cooling fluid into said valve seat, and
      (iii) means for removing said cooling fluid from said valve seat;
   (h) means to adjustably move said fluid cooled panel in said housing with respect to said valve disc; and
   (i) means to frictionally secure said valve to and between spaced apart ends of fluid conducting tubular members.

2. The invention of claim 1 wherein:
   (a) the means to move said fluid cooled panel includes:
      (i) a pin journalled to said housing with one end thereof projecting outside of said housing, said pin having
      (ii) an eccentric portion cooperating with
      (iii) a member slidably mounted in a support fixed to said panel, and
      (iv) means to turn said pin and move said panel in the direction of movement of said valve disc, and
      (v) means to secure said pin after turning it to a selected position.

3. The invention of claim 2 including:
   (a) means to cover the end of said pin that projects out of said housing.

4. The combination including:
   (a) a valve housing having an aperture for the passage of fluid through said valve;
   (b) fluid-cooled, spaced apart first panels removably mounted in said housing;
   (c) a valve disc positioned between said first panels within said housing and movable therein to open and close said aperture;
   (d) a fluid cooled second panel disposed between said first panels within said housing and surrounding said valve disc;
   (e) fluid cooled third panels comprising a bonnet mounted to said valve housing;
   (f) hollow valve seats mounted to said housing and disposed on opposite sides of said second panel and surrounding said aperture, said valve seats each comprising
      (i) an insert disposed within said valve seat and spaced apart therefrom forming narrow annular fluid flow passages within said valve seat and
      (ii) means for introducing cooling fluid into said hollow valve seat, and
      (iii) means for removing said cooling fluid from said valve seat; and
   (g) fluid conduits arranged in juxtaposed spaced apart relation and adjacent said valve seats; and
   (h) means to bring said conduits into frictional engagement with said valve seats whereby a fluid tight seal is made between said valve seats and said conduits.

5. The combination comprising:
 (a) a valve having a housing with an aperture for the passage of fluid through said housing;
 (b) a valve disc disposed in said housing and movable therein to open and close said aperture, said disc including:
  (i) inner and outer spaced apart shells, said inner shell having an aperture therein,
  (ii) means maintaining said shells in spaced apart relation and forming annuli between said shells,
  (iii) means to guide fluid flowing in said annuli along a path toward said aperture,
  (iv) means to introduce cooling fluid into said annuli,
  (v) means to remove cooling fluid from said inner shell;
 (c) spaced apart fluid cooled panels comprising a bonnet mounted to said valve housing:
 (d) a fluid conductive panel disposed within said bonnet and housing and surrounding said valve disc in spaced apart relation thereto;
 (e) spaced apart valve seats mounted to said housing on opposite sides of said valve disc and around said aperture, said valve seat each comprising
  (i) an outer envelope surrounding
  (ii) an insert spaced apart from said envelope and forming narrow annular passages within said valve seat, and
  (iii) means for introducing cooling fluid into said valve seat, and
  (iv) means for removing said cooling fluid from said valve seat, and
  (v) means maintaining said insert in spaced apart relation with respect to said envelope;
 (f) spaced apart ends of fluid conduits;
 (g) fluid cooled adapter flanges mounted to the spaced apart ends of said fluid conduits, each adapter flange cooperating with a valve seat to form a fluid seal;
 (h) first means on each conduit coacting with first fasteners to draw the adapter flanges toward said valve seats when said valve is disposed between the ends of said conduits; and
 (i) second means on said housing coacting with second fasteners and the ends of said conduits for drawing the adapter flanges toward said valve seats whereby, when said first and second fasteners are tightened, said valve seats cooperate with the adapter flanges and said valve is frictionally and sealingly maintained in position between the ends of said conduits.

6. In a gate valve having a housing within which a valve disc is movable to cover and uncover an aperture, the combination with said valve disc of:
 (a) a fluid conductive hollow annular panel disposed in said valve housing and surrounding said valve disc and lying substantially in the plane of said valve disc;
 (b) at least one rotatable pin journalled in said housing and having an accessible end adapted to cooperate with a tool for turning said pin about its axis;
 (c) an eccentric portion on said pin that cooperates with a member mounted to said panel that is movable in a direction at right angles to the direction of movement of said valve disc, said member and said panel being movable in the direction of movement of said valve disc when said pin is rotated;
 (d) means for securing said pin after turning the same and moving said annular panel to a selected position.

7. The invention of claim 6 including:
 (a) removable means covering the accessible end of said pin.

8. The combination comprising:
 (a) a valve having a housing with an aperture for the passage of fluid through said housing, and
 (b) a valve disc disposed in said housing and movable therein to open and close said aperture, said disc including
  (i) inner and outer spaced apart shells, said inner shell having an aperture therein, and
  (ii) means maintaining said shells in spaced apart relation and forming annuli between said shells, and
  (iii) means to guide fluid flowing in said annuli along a path toward said aperture, and
  (iv) means to introduce cooling fluid into said annuli, and
  (v) means to remove cooling fluid from said inner shell;
 (c) spaced apart fluid cooled panels comprising a bonnet mounted to said valve housing, including
  (i) means to introduce cooling fluid into said panels, and
  (ii) means to remove cooling fluid from said panels;
 (d) a fluid conductive panel disposed within said housing and bonnet and surrounding in spaced apart relation said valve disc and lying substantially in the plane of said valve disc;
 (e) means to introduce cooling fluid into said panel;
 (f) means to remove said cooling fluid from said panel;
 (g) spaced apart valve seats mounted to said housing on opposite sides of said valve disc and around said aperture, said valve seats each comprising
  (i) an outer envelope surrounding
  (ii) an insert spaced apart from said envelope and forming narrow annular passages within said valve seat, and
  (iii) means for introducing cooling fluid into said valve seat, and
  (iv) means for removing said cooling fluid from said valve seat, and
  (v) means maintaining said insert in spaced apart relation to said envelope;
 (h) at least one rotatable pin journalled in said housing having an accessible end adapted to cooperate with a tool for turning said pin about an axis;
 (i) an eccentric portion on said pin that cooperates with
 (j) means slidable relative to said panel in a direction at right angles to the direction said valve disc moves, whereby when said pin is turned said annular panel moves only in a direction parallel to the direction said valve disc moves;
 (k) means for securing said pin after turning the same and moving said annular panel to a selected position;
 (l) removable means covering the accessible end of said pin;
 (m) fluid conductive conduits arranged in juxtaposed spaced apart position with respect to said valve seats;
 (n) hollow adapter flanges mounted to the ends of said conduits that coact with said valve seats to form a seal therebetween;
 (o) means for introducing cooling fluid into said flanges;
 (p) means for withdrawing said cooling fluid from said flanges;
 (q) first means on each conduit coacting with first fasteners to draw the ends of said conduits and said flanges into contact with said valve seats when said valve is disposed between the ends of said conduits; and
 (r) second means on said housing coacting with second fasteners and the ends of said conduits and said flanges for drawing the ends of said conduits and said flanges into contact with said valve seats, whereby when said first and second fasteners are tightened said valve seats cooperate with said flanges and said valve is frictionally and sealingly maintained in position between the ends of said conduits.

References Cited

UNITED STATES PATENTS

| | | | |
|---|---|---|---|
| 1,070,693 | 8/1913 | Keiser | 137—340 |
| 1,102,197 | 6/1914 | Knox | 137—340 |
| 1,824,434 | 9/1931 | Hushour | 137—340 |
| 1,905,638 | 4/1933 | Hushour | 137—340 |
| 2,132,262 | 10/1938 | Gabriel | 137—340 |
| 2,204,724 | 6/1940 | Cope | 137—340 |
| 2,331,465 | 10/1943 | Fox | 137—340 |
| 2,884,959 | 5/1959 | Neely | 137—340 XR |
| 3,040,773 | 6/1962 | McInerney | 137—340 XR |
| 3,207,174 | 9/1965 | Berczynski | 137—340 XR |
| 3,266,517 | 8/1966 | Carr | 137—340 |

SAMUEL SCOTT, Primary Examiner